United States Patent
Peng et al.

(10) Patent No.: US 12,060,519 B1
(45) Date of Patent: Aug. 13, 2024

(54) PLANT-BASED SELF-DEGRADABLE GEL DIVERTING AGENT AND PREPARATION METHOD THEREFOR

(71) Applicant: Southwest Petroleum University, Chengdu (CN)

(72) Inventors: Yu Peng, Chengdu (CN); Jiandu Ye, Chengdu (CN); Yongming Li, Chengdu (CN); Pengfei Chen, Chengdu (CN); Pengjun Shi, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/603,436

(22) Filed: Mar. 13, 2024

(30) Foreign Application Priority Data

Sep. 27, 2023 (CN) .......................... 202311254209.6

(51) Int. Cl.
*C09K 8/42* (2006.01)
(52) U.S. Cl.
CPC .................... *C09K 8/426* (2013.01)
(58) Field of Classification Search
CPC ..................................................... C09K 8/426
See application file for complete search history.

(56) References Cited

U.S. PATENT DOCUMENTS

2007/0203028 A1* 8/2007 Lewis ................. C04B 28/02
507/221

FOREIGN PATENT DOCUMENTS

| CN | 115558053 A | 1/2023 |
| CN | 115838589 A | 3/2023 |

* cited by examiner

*Primary Examiner* — Crystal J Lee
(74) *Attorney, Agent, or Firm* — Birchwood IP

(57) ABSTRACT

The present invention discloses a plant-based self-degradable gel diverting agent and a preparation method therefor. The preparation method comprises the following steps: adjusting a pH of a formaldehyde solution, adding urea in three batches, heating and stirring, adding furfural in the process of adding a second batch of urea until a plant-based urea-formaldehyde resin is obtained through the reaction, completely dissolving starch in water, uniformly stirring to obtain a gelatinized starch solution, adding the plant-based urea-formaldehyde resin, adding a curing agent, and uniformly stirring, mixing and curing to obtain a product. The resin plugging agent is a liquid homogeneous system and has a low initial viscosity; the system is particle-free, can enter tiny slits; and the gel temporary plugging agent does not need to be added with a gel breaker at a temperature of 100-180° C., the temporary plugging agent can be completely degraded.

4 Claims, 3 Drawing Sheets

PLANT-BASED SELF-DEGRADABLE GEL DIVERTING AGENT AND PREPARATION METHOD THEREFOR

CROSS-REFERENCE TO RELATED APPLICATIONS

This application claims priority to Chinese Patent Application No. 202311254209.6, filed on Sep. 27, 2023, which is hereby incorporated by reference in its entirety.

TECHNICAL FIELD

The present invention relates to the technical field of oilfield chemistry, and in particular, to a plant-based self-degradable gel diverting agent and a preparation method therefor.

BACKGROUND

In recent years, the temporary plugging and diverting fracturing technology has been widely applied to various fields of unconventional oil and gas resource development. This technology is characterized in that a temporary plugging agent (also called a diverting agent) is injected into a stratum to temporarily plug an initial fracture or a perforation, then fracturing fluid pumped subsequently is diverted from a high-permeability area to a low-permeability area for fracturing so as to activate a natural fracture or open a new fracture, after construction is completed, plugging formed by the temporary plugging agent is removed by dissolving, degrading or gel breaking, a flow conductivity of the plugged fracture or perforation is recovered, and the purposes of increasing the complexity of a fracture network and improving the oil and gas recovery ratio are finally achieved. In the construction process, a fracturing temporary plugging agent plays an important role in plugging old fractures, improving net pressure in the fractures and opening new fractures, and directly influences the effect of reservoir fracturing stimulation. After decades of development, a variety of temporary plugging agent systems have been formed, mainly including a particle temporary plugging agent, a fiber temporary plugging agent and a gel temporary plugging agent. Among them, the particle temporary plugging agent has been widely used in oilfields due to high plugging strength, wide temperature application range and low raw material price. However, the particle temporary plugging agent has the problems such as complex construction technology, difficulty in injection, and incomplete degradation that damages the stratum. Compared with the particle temporary plugging agent, the fiber temporary plugging agent has better flexibility, strong deformability and relatively simple injection mode, and it is only required to soften the fiber in a carrier liquid and then inject the fiber temporary plugging agent together with the carrier liquid. However, the fiber temporary plugging agent has low plugging strength, and is often required to be combined with other temporary plugging agents in practical application. The gel temporary plugging agent is formed by cross-linking polymers and mainly has two forms, namely preformed gel particles and a liquid gel temporary plugging agent. The preformed gel particles are formed by cross-linking and granulating gel on the ground. The gel particles are carried to a pore throat or a fracture by fracturing fluid when the gel particles are applied, and the particles are melted and cross-linked again to form a rubber plug to plug the fracture or the perforation under the high-temperature action of a reservoir. Chinese Patent Application No. CN115838589A discloses a high-strength particle temporary plugging agent for fracturing diversion and a preparation method therefor, wherein the temporary plugging agent consists of polyvinyl alcohol, aldehyde cross-linking agent, latent acid catalyst and water. This temporary plugging agent is prepared by physical cross-linking and crushing on the ground, and the particles produced have high strength and good elasticity. Under the action of stratum temperature and water, the temporary plugging agent can be automatically degraded after being stabilized for a period of time without adding an additional plugging removal agent. However, such preformed gel particles suffer from the same disadvantages as the particle temporary plugging agent: injection is difficult, and the plugging may be caused in a shaft.

The liquid gel temporary plugging agent is liquid at room temperature and has a simple injection method. After injection, the liquid gel temporary plugging agent cross-links under the reservoir condition to form a high-strength rubber plug to plug an initial fracture or a perforation. After construction is completed, the rubber plug reacts with a gel breaker or self-degrades to form small molecules that flow back to the surface, causing little harm to the reservoir. Therefore, the liquid gel temporary plugging agent has become a hot research topic. Chinese Patent Application No. CN115558053A discloses a gel temporary plugging agent and a preparation method therefor, wherein the gel temporary plugging agent consists of a small molecular monomer, an unstable cross-linking agent, an additive, an initiator, a pH regulator and the balance of water, and has the advantages of no gel breaker required for degradation, controllable system degradation time, simple preparation process and stable performance. However, this gel temporary plugging agent has the defects such as low applicable temperature (50-90° C.) and short gelling time (30-100 min).

In view of the common problems of current liquid gel temporary plugging agent that the raw materials are non-environmentally friendly materials, the applicable temperature is low and the gel is difficult to break, the present invention prepares a plant-based self-degradable gel diverting agent by using urea-formaldehyde resin (UF) and starch, wherein the gel diverting agent has the advantages of environment-friendly raw materials, high strength, self-degradation, wide application temperature range, small damage to a reservoir and the like, and has important significance for achieving green development of an oilfield and improving the oil and gas recovery ratio.

SUMMARY

In view of this, the present invention aims to provide a plant-based self-degradable gel diverting agent and a preparation method therefor, wherein the gel diverting agent has the advantages such as high compressive strength and adhesive strength, degradability, excellent plugging performance and low price.

The preparation method for a plant-based self-degradable gel diverting agent disclosed by the present invention mainly comprises the following steps:

step S1: adjusting a pH value of a formaldehyde solution to 7.0-8.0 by using a NaOH solution with a mass fraction of 25-30%, adding a first batch of urea under stirring and heating at 35-45° C., then heating to 90° C. within 30 min, stirring for 1-1.5 h under this temperature condition, then cooling to 75-85° C., adding a second batch of urea and furfural, adjusting the pH value of a reaction solution to 4.8-6.1 by using a formic acid solution with a mass fraction of 25-30%, continuing the reaction until the reaction solution is turbid when dropping into water with a temperature of 20° C., adjusting the pH value of the reaction solution to 7.5-8.0 within 2-3 min by using a NaOH solution with the mass fraction of 25-30%, then cooling to 70-75° C., adding a third batch of urea, reacting for 0.5 h under this temperature condition, adjusting the pH value to 7.0-8.0 after the reaction is completed, and cooling to 40-50° C. to obtain a plant-based urea-formaldehyde resin; and step S2: completely dissolving starch in water, uniformly stirring to obtain a gelatinized starch solution, then adding the plant-based urea-formaldehyde resin obtained in the step S1 into the solution, simultaneously adding a curing agent, uniformly stirring for 30 min, uniformly mixing, and curing at a constant temperature of 100-180° C. for 1-10 h to obtain the product.

In one embodiment of the present invention, in the step S1, an addition amount of the first batch of urea is 45%-60% of a total molar amount of urea, an addition amount of the second batch of urea is 15%-31% of a total molar amount of urea, and an addition amount of the third batch of urea is 18%-38% of a total molar amount of urea.

In one embodiment of the present invention, in the step S1, a molar ratio of the formaldehyde solution, the furfural and the urea is 1:0.2-0.5:0.9-1.2.

In one embodiment of the present invention, in the step S2, an amount of the plant-based urea-formaldehyde resin is 9.8-21.3 parts by weight, an amount of the starch is 5.8-12.5 parts by weight, an amount of the curing agent is 0.5-1.2 parts by weight, and the balance is water, wherein a sum of the parts by weight of the compositions is 100 parts.

In one embodiment of the present invention, the curing agent is one or a combination of ammonium chloride, ammonium sulfate, ammonium persulfate and potassium persulfate.

In one embodiment of the present invention, the starch is one of pregelatinized starch, amylopectin and amylose.

In addition, the present invention further discloses a plant-based self-degradable gel diverting agent prepared by the method.

The present invention has the technical effects as follows:
(1) the urea-formaldehyde resin is synthesized from furfural, formaldehyde and urea, has the characteristics such as wide source, low price, environmental friendliness and degradability, and has important significance in the aspects of economy and environment;
(2) starch is the second largest renewable resource in nature, and has the advantages such as wide source, low price, biodegradability, no toxicity and no peculiar smell;
(3) the resin plugging agent is a liquid homogeneous system, and the initial viscosity of the resin is low; the system is plant-based, so that the damage to the stratum is small; the system is particle-free, can enter tiny slits, has excellent deep performance, and can achieve long-distance plugging adjustment; and
(4) the gel diverting agent does not need to be added with a gel breaker at a temperature of 100-180° C., the diverting agent can be completely degraded, and the degraded solution has similar properties with oil and water and will not cause damage to an oil reservoir.

BRIEF DESCRIPTION OF THE DRAWINGS

In order to more clearly illustrate the technical solutions in the examples of the present invention or in the prior art, the drawings required to be used in the description of the examples or the prior art are briefly introduced below. It is obvious that the drawings in the description below are some examples of the present invention, and those of ordinary skill in the art can obtain other drawings according to the drawings provided herein without creative efforts. In the drawings.

DESCRIPTION OF EMBODIMENTS

Figure 1:
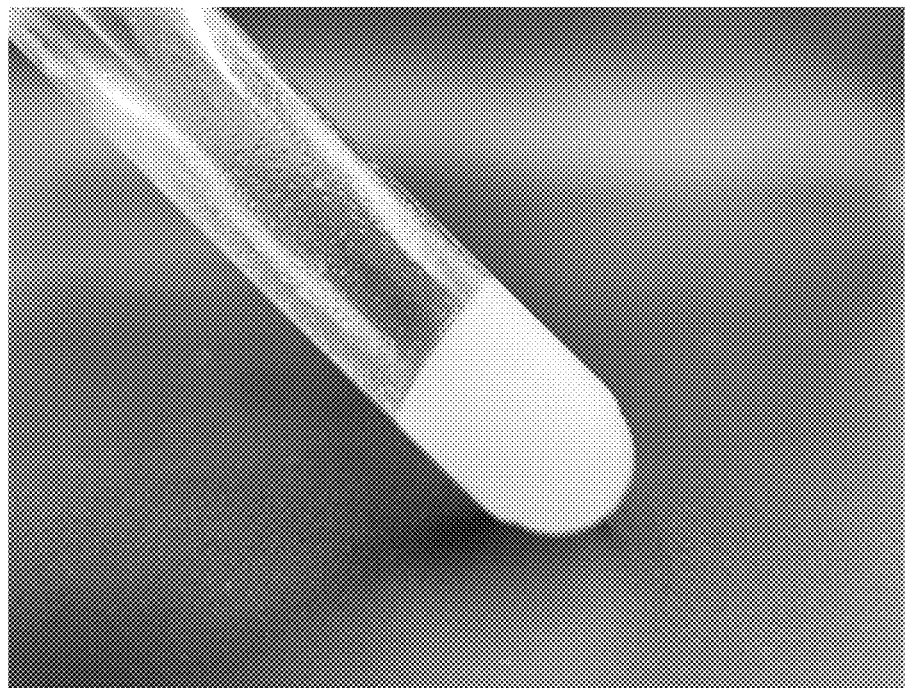
FIG. 1 is a morphology diagram of a gel after solidification according to the present invention.

The present invention is further described in detail below with reference to the examples; however, the examples of the present invention are not limited thereto. Unless otherwise stated, the experimental methods used in the following examples are conventional methods. The materials, reagents, and the like used in the following examples can be commercially available unless otherwise stated.

Example 1

Preparation of a Plant-Based Urea-Formaldehyde Resin:

weighing 90.27 g of a formaldehyde solution, 21.61 g of furfural and 66.69 g of urea with a mass fraction of 37% based on a molar ratio of formaldehyde to furfural to urea of 1:0.2:1; adding the formaldehyde solution into a three-necked flask at one time and starting a stirrer; then adjusting a pH value to 7.0-8.0 by using a NaOH solution with a mass fraction of 25%; adding 33.39 g of a first batch of urea when heating to 40° C., then heating to 90° C. within 30 min and continuing stirring for 1 h at this temperature; then cooling to 84° C., adding 16.74 g of a second batch of urea and furfural, and simultaneously adjusting the pH to 4.8-6.1 by using a formic acid solution with a mass fraction of 25%; continuing the reaction until the reaction solution is turbid when dropping into water with a temperature of 20° C., adjusting the pH value of the reaction solution to 7.5-8.0 within 3 min by using a NaOH solution with the mass fraction of 25%; then cooling to 70° C., adding a third batch of 16.56 g of urea, and reacting at this temperature for 0.5 h; and finally, adjusting the pH value to 7.0-8.0, and cooling to 40° C. to obtain the plant-based urea-formaldehyde resin.

Preparation of a Plant-Based Self-Degradable Gel Diverting Agent:

adding 77.5 g of water into a 150 mL beaker, slowly adding 12.2 g of pregelatinized starch into the beaker at a stirring speed of 800 r/min, and uniformly stirring; and then sequentially adding 9.8 g of the plant-based urea-formaldehyde resin and 0.5 g of ammonium chloride into the beaker, adjusting the stirring speed to 400 r/min, continuously stirring for 30 min to obtain a reaction solution, placing the reaction solution in an oven at a temperature of 130° C., and curing for 7 h to obtain the plant-based self-degradable gel diverting agent.

Example 2

The preparation steps and the raw material amount of the plant-based urea-formaldehyde resin in this example are the same as those of Example 1, except that the preparation steps of the plant-based self-degradable gel diverting agent in this example are as follows:

adding 76.9 g of water into a 150 mL beaker, slowly adding 10.9 g of amylopectin into the beaker at a stirring speed of 800 r/min, fully gelatinizing at 90° C., cooling to room temperature, sequentially adding 11.7 g of a plant-based urea-formaldehyde resin and 0.5 g of ammonium chloride into the beaker, adjusting the stirring speed to 400 r/min, continuously stirring for 30 min to obtain a reaction solution, placing the reaction solution into an oven at a temperature of 180° C., and curing for 5 h to obtain the plant-based self-degradable gel diverting agent.

Example 3

The preparation steps and the raw material amount of the plant-based urea-formaldehyde resin in this example are the same as those of Example 1, except that the preparation steps of the plant-based self-degradable gel diverting agent in this example are as follows:

adding 75.9 g of water into a 150 mL beaker, slowly adding 9.6 g of pregelatinized starch into the beaker at a stirring speed of 800 r/min, fully gelatinizing at 90° C., cooling to room temperature, sequentially adding 13.9 g of a plant-based urea-formaldehyde resin and 0.6 g of ammonium sulfate into the beaker, adjusting the stirring speed to 400 r/min, continuously stirring for 30 min to obtain a reaction solution, placing the reaction solution into an oven at a temperature of 100° C., and curing for 7 h to obtain the plant-based self-degradable gel diverting agent.

Example 4

The preparation steps and the raw material amount of the plant-based urea-formaldehyde resin in this example are the same as those of Example 1, except that the preparation steps of the plant-based self-degradable gel diverting agent in this example are as follows:

adding 75.5 g of water into a 150 mL beaker, slowly adding 8.2 g of amylose into the beaker at a stirring speed of 800 r/min, and uniformly stirring; and then sequentially adding 15.6 g of the plant-based urea-formaldehyde resin and 0.7 g of ammonium chloride into the beaker, adjusting the stirring speed to 400 r/min, continuously stirring for 30 min to obtain a reaction solution, placing the reaction solution in an oven at a temperature of 180° C., and curing for 4 h to obtain the plant-based self-degradable gel diverting agent.

Example 5

The preparation steps and the raw material amount of the plant-based urea-formaldehyde resin in this example are the same as those of Example 1, except that the preparation steps of the plant-based self-degradable gel diverting agent in this example are as follows:

adding 73.8 g of water into a 150 mL beaker, slowly adding 7.5 g of amylopectin into the beaker at a stirring speed of 800 r/min, fully gelatinizing at 90° C., cooling to room temperature, sequentially adding 17.8 g of a plant-based urea-formaldehyde resin and 0.9 g of ammonium persulfate into the beaker, adjusting the stirring speed to 400 r/min, continuously stirring for 30 min to obtain a reaction solution, placing the reaction solution into an oven at a temperature of 180° C., and curing for 2 h to obtain the plant-based self-degradable gel diverting agent.

Example 6

The preparation steps and the raw material amount of the plant-based urea-formaldehyde resin in this example are the same as those of Example 1, except that the preparation steps of the plant-based self-degradable gel diverting agent in this example are as follows:

adding 72.7 g of water into a 150 mL beaker, slowly adding 6.5 g of pregelatinized starch into the beaker at a stirring speed of 800 r/min, and uniformly stirring; and then sequentially adding 20.3 g of the plant-based urea-formaldehyde resin and 0.5 g of ammonium chloride into the beaker, adjusting the stirring speed to 400 r/min, continuously stirring for 30 min to obtain a reaction solution, placing the reaction solution in an oven at a temperature of 130° C., and curing for 6 h to obtain the plant-based self-degradable gel diverting agent.

To further illustrate the specific effects of the present invention, the product performance of the present invention will be evaluated in the following examples.

1. Curing Self-Degradation Experiment:

10 g of the plant-based self-degradable gel diverting agent obtained in Example 6 was weighed and placed in an ampoule bottle, the ampoule bottle was placed in an aging tank, the aging tank was placed in an oven at 130° C., and a self-degradation experiment was performed, wherein a morphology diagram of the plant-based self-degradable gel diverting agent in the ampoule bottle is shown in FIG. 1.

Figure 2:
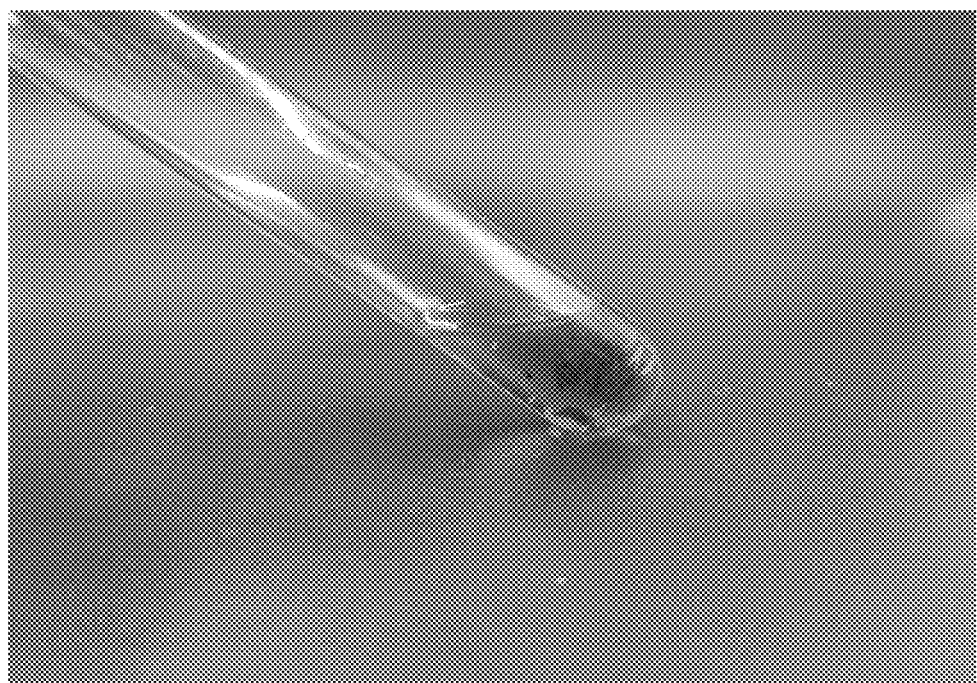
FIG. 2 is a morphology diagram of a gel after degradation according to the present invention.

When the plant-based self-degradable gel diverting agent is completely degraded, the morphology diagram of the plant-based self-degradable gel diverting agent after being completely degraded at 130° C. is shown in FIG. 2. It can be seen from FIG. 2 that the degraded liquid has low viscosity and basically no residue, and the plant-based self-degradable gel diverting agent is easy to flow back in a stratum and cannot cause damage to the stratum.

2. Plugging Performance Test:

The plant-based self-degradable gel diverting agents prepared in Examples 1 to 6 are respectively marked as No. 1 to No. 6, and the plugging capacity is examined. The experimental steps were as follows: a 2 mm steel core was used as a research object, a reaction solution of a plant-based self-degradable gel diverting agent was injected into the steel core at a displacement speed of 0.5 mL/min, curing was performed for 1-10 h at 130-180° C. according to preparation conditions of examples to form plugging, water was injected for displacement at a speed of 0.5 mL/min, and after pressure difference was stabilized for half an hour, and the permeability k1 after plugging was calculated according to Darcy's law, which is shown in Table 1. The degradation was performed at a constant temperature of 130-180° C., and water was injected for displacement at 0.5 mL/min to obtain a permeability k2 after degradation, which is shown in Table 1. The plugging rate E was calculated by the formula (1):

$$E_x = (k_0 - k_x)/k_0 \tag{1}$$

In the formula (1), $E_x$ is the plugging rate before and after plugging degradation, x=1 or 2;

$k_0$ is the initial permeability of the core; and $k_x$ is the permeability of the core before and after degradation, x=1 or 2.

TABLE 1

Plugging rates of diverting agents in different systems

| No. | Before degradation | | | After degradation | | Permeability recovery (%) |
|---|---|---|---|---|---|---|
|  | k0, μm2 | k1, μm2 | E1, % | k2, μm2 | E2, % |  |
| 1# | 1.29 | 0.005 | 99.61 | 1.282 | 0.62 | 99.38 |
| 2# | 1.29 | 0.004 | 99.69 | 1.281 | 0.69 | 99.31 |
| 3# | 1.29 | 0.003 | 99.77 | 1.279 | 0.85 | 99.15 |
| 4# | 1.29 | 0.004 | 99.69 | 1.281 | 0.69 | 99.31 |
| 5# | 1.29 | 0.002 | 99.84 | 1.278 | 0.93 | 99.07 |
| 6# | 1.29 | 0.003 | 99.77 | 1.279 | 0.85 | 99.15 |

Figure 3:
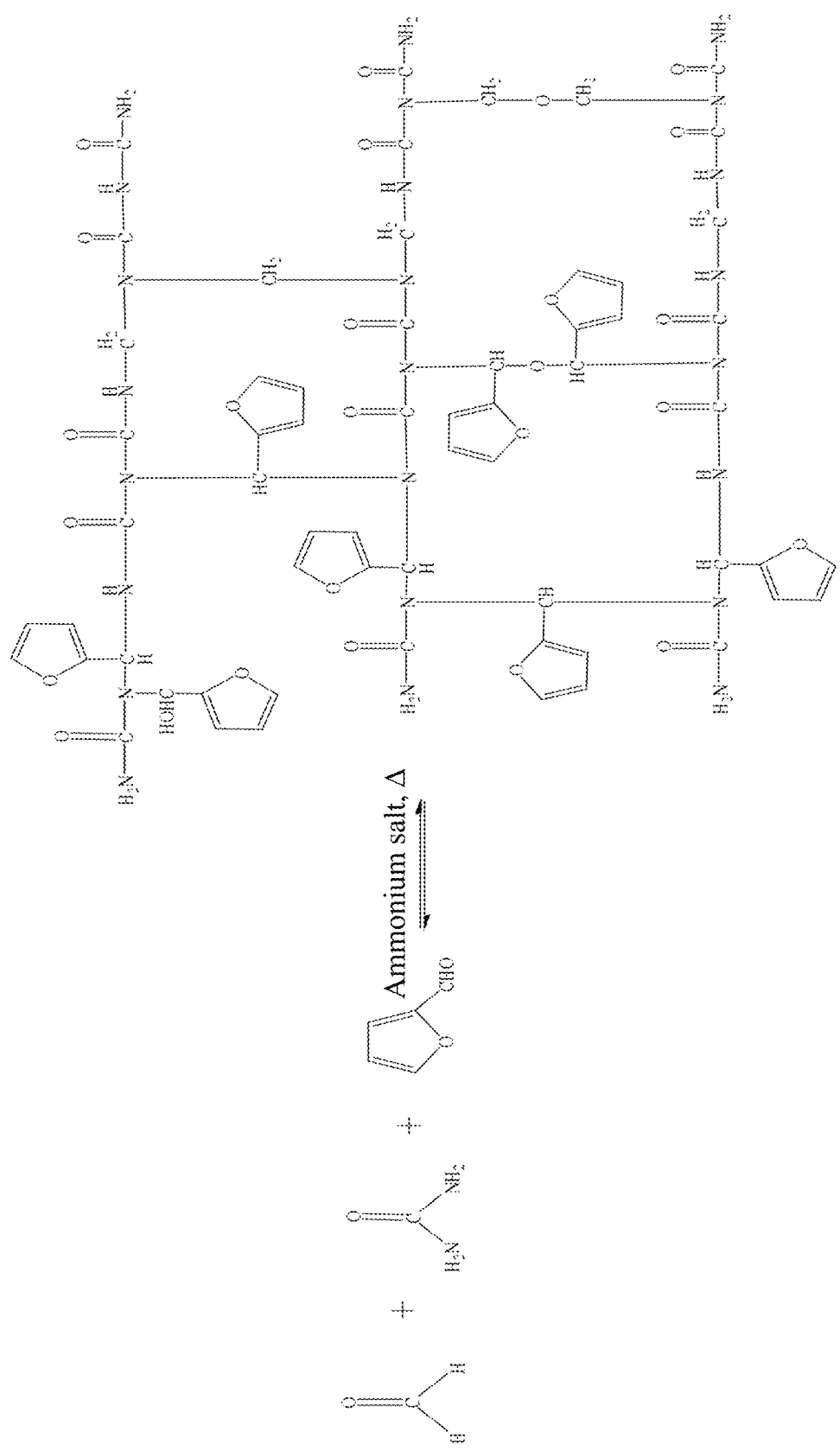
FIG. 3 is a reaction process diagram of urea-formaldehyde resin network forming according to the present invention.
Figure 4:
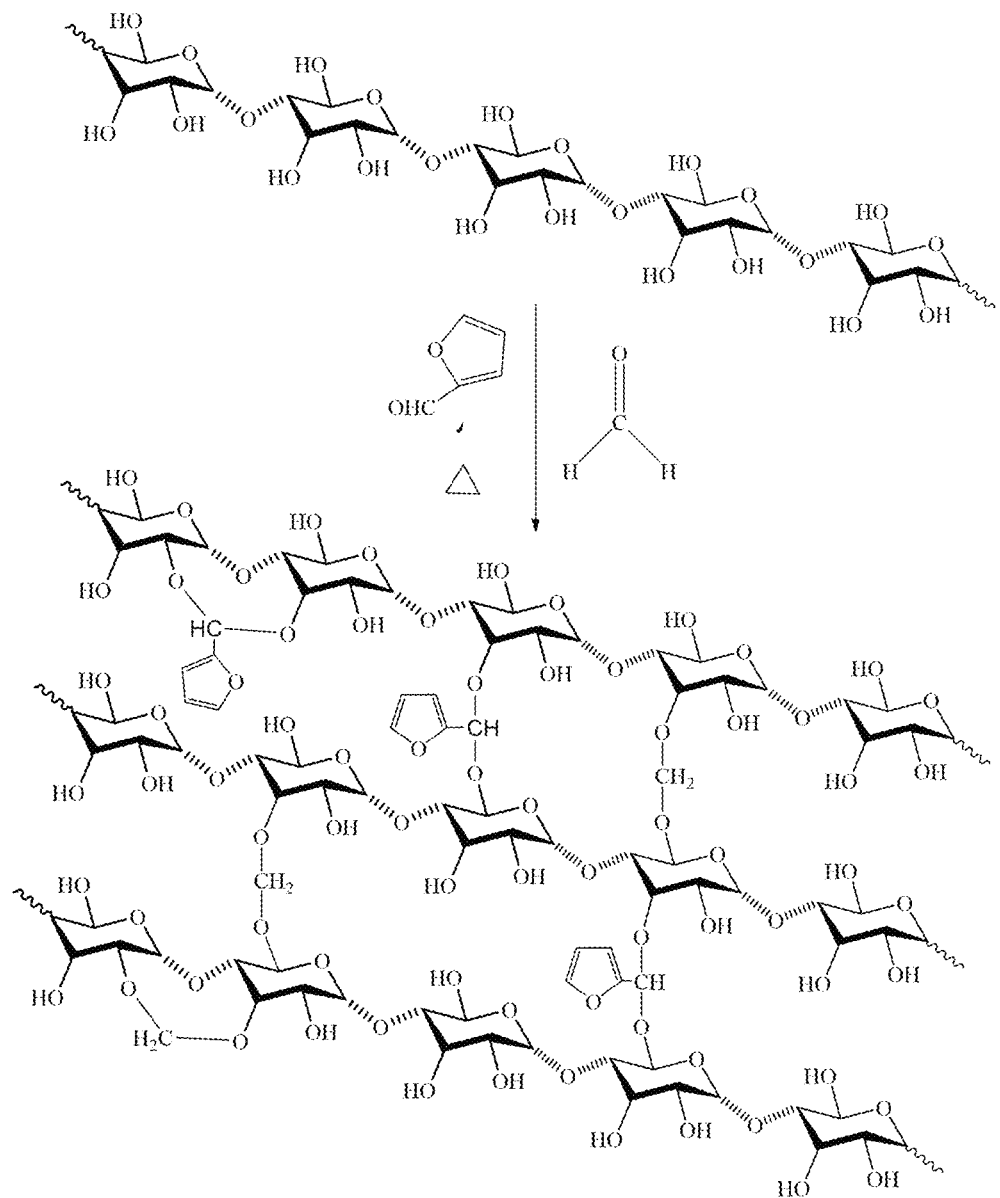
FIG. 4 is a reaction process diagram of a starch network according to the present invention.

It can be seen from Table 1 that, in Examples 1 to 6, the plugging rate before degradation is higher than 99%, the plugging rate after degradation is lower than 1%, and the permeability recovery rate is higher than 99%, which indicates that the gel diverting agent has excellent plugging and degradation performances, and the main principle is as follows: the present invention uses the urea-formaldehyde resin network as shown in FIG. 3 and the starch network and curing agent as shown in FIG. 4 to react chemically to form a three-dimensional structure, and at the beginning of the reaction, the starch and the urea-formaldehyde resin are mixed to form an initial starch network with a low cross-linking density. With the low fluidity of a macromolecular chain, the position of the starch chain is difficult to change, urea, formaldehyde and plant aldehyde react in the starch network, the urea-formaldehyde resin network grows in the starch network and mutually permeates, a uniform network structure can be finally obtained, which ensures the plugging effect of the diverting agent, and a plant-based part of the urea-formaldehyde resin ensures the degradation performance of the diverting agent.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention. Therefore, the protection scope of the present invention shall be subject to the protection scope of the claims.

What is claimed is:

1. A preparation method for a plant-based self-degradable gel diverting agent, comprising the following steps:
   step S1: adjusting a pH value of a formaldehyde solution to 7.0-8.0 by using a NaOH solution with a mass fraction of 25-30%, adding a first batch of urea under stirring and heating at 35-45° C., then heating to 90° C. within 30 min, stirring for 1-1.5 h under this temperature condition, then cooling to 75-85° C., adding a second batch of urea and furfural, adjusting the pH value of a reaction solution to 4.8-6.1 by using a formic acid solution with a mass fraction of 25-30%, continuing the reaction until the reaction solution is turbid when dropping into water with a temperature of 20° C., adjusting the pH value of the reaction solution to 7.5-8.0 within 2-3 min by using a NaOH solution with the mass fraction of 25-30%, then cooling to 70-75° C., adding a third batch of urea, reacting for 0.5 h under this temperature condition, adjusting the pH value to 7.0-8.0 after the reaction is completed, and cooling to 40-50° C. to obtain a plant-based urea-formaldehyde resin; wherein an addition amount of the first batch of urea is 45%-60% of a total molar amount of urea, an addition amount of the second batch of urea is 15%-31% of a total molar amount of urea, an addition amount of the third batch of urea is 18%-38% of a total molar amount of urea, and a molar ratio of the formaldehyde solution, the furfural and the urea is 1:0.2-0.5:0.9-1.2; and
   step S2: completely dissolving starch in water, uniformly stirring to obtain a gelatinized starch solution, then adding the plant-based urea-formaldehyde resin obtained in the step S1 into the gelatinized starch solution, simultaneously adding a curing agent, uniformly stirring for 30 min, uniformly mixing, and curing at a constant temperature of 100-180° C. for 1-10 h to obtain the plant-based self-degradable gel diverting agent, wherein an amount of the plant-based urea-formaldehyde resin is 9.8-21.3 parts by weight, an amount of the starch is 5.8-12.5 parts by weight, an amount of the curing agent is 0.5-1.2 parts by weight, and the balance is water, based on a sum equal to 100 parts.

2. The preparation method for a plant-based self-degradable gel diverting agent according to claim 1, wherein the curing agent is one or a combination of ammonium chloride, ammonium sulfate, ammonium persulfate and potassium persulfate.

3. The preparation method for a plant-based self-degradable gel diverting agent according to claim 1, wherein the starch is one of pregelatinized starch, amylopectin and amylose.

4. A plant-based self-degradable gel diverting agent prepared by using the method according to claim 1.

* * * * *